May 9, 1939.   C. F. BAISCH   2,157,994

BRAKE MECHANISM

Filed Nov. 8, 1937

INVENTOR
CARL F. BAISCH
BY
ATTORNEYS

Patented May 9, 1939

2,157,994

UNITED STATES PATENT OFFICE 2,157,994

BRAKE MECHANISM

Carl F. Baisch, Detroit, Mich., assignor to Kelsey-Hayes Wheel Company, Detroit, Mich., a corporation of Delaware Application November 8, 1937, Serial No. 173,525

8 Claims. (Cl. 188—79.5)

This invention relates generally to vehicle wheel brakes and refers more particularly to an improved adjustment device for the brake friction means.

It is one of the principal objects of this invention to provide a relatively simple, inexpensive adjustment device substantially free from back lash and capable of adjusting the brake friction means to very close limits.

Another advantageous feature of the present invention resides in the provision of an adjustment device capable of being used with either servo or symmetrical brakes and, when employed in the former type of brake, operates to transfer torque from the leading portion of the friction means to the trailing portion of the latter.

The foregoing, as well as other objects, will be made more apparent as this description proceeds, especially when considered in connection with the accompanying drawing, wherein.

Figure 1:
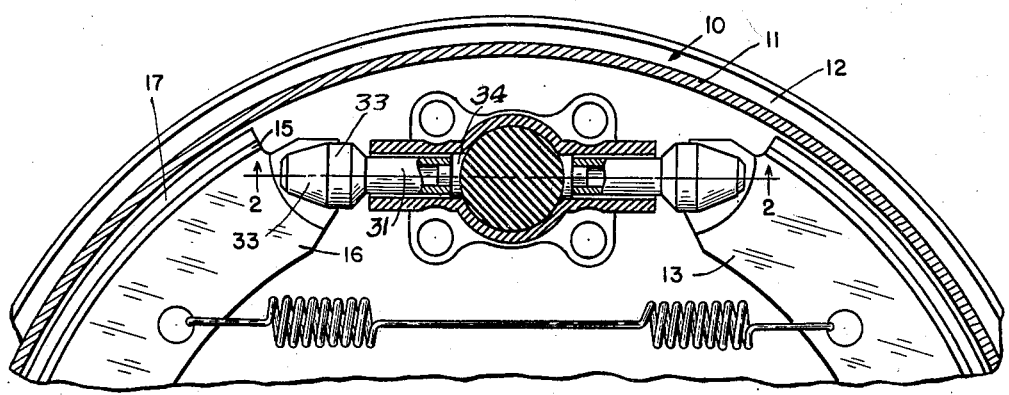
Figure 1 is a side elevational view, partly in section, of brake mechanism having an adjustment device constructed in accordance with this invention.
Figure 2:
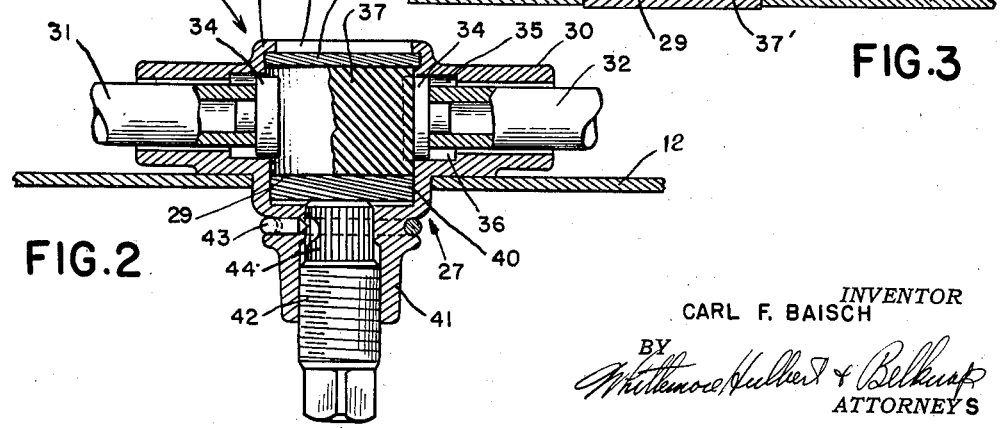
Figure 2 is a sectional view taken substantially on the plane indicated by the line 2—2 of Figure 1.

The brake selected herein for the purpose of illustrating the present invention is of the two-shoe servo type, although it will be understood as this description proceeds that my improved adjustment device may be advantageously employed in connection with symmetrical brakes. In the embodiment of the invention illustrated in Figures 1 and 2, the numeral 10 designates a brake drum having an annular brake flange 11 and having a backing plate 12. In accordance with conventional practice, the brake drum 10 is revoluble with the vehicle wheel (not shown), and the backing plate is fixed against rotation with the brake drum.

Supported upon the backing plate 12 within the brake drum is a pair of brake shoes 13 and 14 having the adjacent ends spaced from each other circumferentially of the brake drum. The brake shoes are substantially T-shaped in cross section and are positioned within the brake drum with the head portions 15 extending axially of the brake drum in substantially parallel relation with the annular brake flange 11 and with the web portions 16 extending radially of the brake drum.

A lining 17 having the desired coefficient of friction is secured to the outer surface of the head 15 of each shoe for frictional engagement with the inner surface of the annular brake flange 11.

The shoes are centered within the brake drum by means of a stud 18 secured to the backing plate 12 and extending between the ends of the shoes at one side of the drum for abutting engagement with said ends. The latter ends of the shoes are yieldably maintained into abutting engagement with the opposite sides of the stud 18 by means of a retraction spring 19 having the opposite ends respectively connected to the shoes 13 and 14 adjacent the ends of the latter which abut the stud 18. Upon reference to Figure 1, it will be noted that the latter ends of the shoes are moved outwardly against the action of the spring 19 to engage the linings 17 on the shoes with the brake flange 11 by means of an actuator 20. This actuator may be of any suitable type which will not only effectively move the brake shoes outwardly into engagement with the brake flange 11, but which will also permit limited circumferential shifting movement of the shoes relatively to the backing plate. One form of actuator which has been found particularly satisfactory for accomplishing the above purpose is the floating wedge type, and the latter is specifically shown herein for the purpose of illustrating the invention. Briefly described, the reference character 21 designates a wedge having diverging opposite side portions 22 respectively engaging rollers 23 secured to the shoes 13 and 14. The wedge is moved radially outwardly by means of a suitable actuator 24 and is provided with an enlarged opening 25 therethrough for receiving the stud 18. The opening 25 is sufficiently greater in dimension than the diameter of the portion of the stud 18 extending therethrough to permit the desired shifting movement of the brake shoes circumferentially of the drum.

In accordance with this invention, the brake shoes are anchored at the opposite ends thereof by means of an adjustment device 26 which has the additional function of moving the shoes outwardly about the abutment 18 to obtain the desired clearance between the linings 17 and adjacent surface of the brake flange 11. The adjustment device comprises a bracket 27 riveted, or otherwise fixedly secured to the backing plate 12 and having a portion 28 located within the brake drum 10 between the adjustment ends of the brake shoes. Upon reference to Figure 2, it will be noted that the portion 28 of the bracket is provided with a central chamber 29 having axially aligned tubular extensions 30 projecting toward the adjustment ends of the shoes from opposite sides of the chamber 29. The tubular portions 30 of the anchor bracket 27 slidably receive a pair of links 31 and 32 having head portions 33 at the outer ends radially slotted to slidably receive the portions of the web 16 of the brake shoes at the adjustment ends of the latter. The inner or adjacent ends of the adjustment links are also provided with enlarged heads 34 having substantially flat outer surfaces which cooperate to form opposite side wall portions of the chamber 29. The peripheries of the head portions 34 are transversely curved and have a sliding fit with the inner walls 35 of counterbored recesses 36 formed in the adjacent ends of the tubular portions 30. The purpose of this construction is to permit a limited angular movement of the links through paths parallel to the brake shoes and thereby insure engagement of the adjustment ends of the shoes with the brake drum when the actuator 20 is operated. The lengths of the recesses 36 are sufficient to provide the outward movement of the adjustment links required to effect the desired adjustment and, for the purpose of assembly, the heads 34 are removable from the adjacent ends of the adjustment links.

A block 37 of resilient relatively non-compressible material, such as rubber, is positioned in the chamber 29 between the heads 34 on the adjacent ends of the adjustment links and this block is inserted through an opening 38 formed in the axially inner wall of the portion 28 of the adjustment bracket 27. After the block has been assembled in the chamber 29, the opening 38 is permanently closed by means of a plug 39 and the latter forms the inner wall of the chamber 29. The axially outer wall of the chamber 29 is formed by a plate 40 slidably supported in the adjustment bracket for movement toward and away from the outer wall or plug 39. Thus, it will be seen that the block 37 is confined in the chamber 29 between the adjacent ends of the adjustment links and that movement of the plate 40 in a direction toward the plug 39 effects a displacement of the opposite side walls of the block in an outward direction. This displacement of the block causes the adjustment links to move outwardly and, since the adjustment links are connected to the brake shoes, the latter will also be moved outwardly about the stud 18.

Referring again to Figure 2 of the drawing, it will be noted that the adjustment bracket 27 is provided with a reduced portion 41 which extends through an opening in the backing plate and is internally threaded for receiving an adjusting screw 42. The inner end of the adjusting screw 42 bears against the plate 40 and operates to apply the pressure on the resilient block required to effect movement of the adjustment ends of the shoes outwardly toward the brake flange of the drum. The screw 42 is normally held from accidental rotation by means of a spring 43 secured to the portion 41 of the adjustment bracket and having one end extending through the portion 41 into engagement with suitable serrations 44 formed in the screw 42. With this construction, it will be noted that the screw 42 is not only held from accidental rotation, but predetermined increments of adjustment of the screw are indicated.

When it is desired to adjust the brake shoes relative to the brake flange, the screw 42 is threaded into the bracket to apply sufficient pressure on the resilient block between the adjacent ends of the adjustment links to move the brake shoes into engagement with the brake flange. The pressure on the block is then relieved by backing off the screw 42 the number of increments of adjustment required to secure the desired clearance between the friction linings 17 on the shoes and the adjacent surface of the brake flange.

It has been stated above that the brake selected herein is of the servo type and that the actuator 20 allows circumferential shifting movement of the brake shoes relative to the backing plate by the torque resulting from engagement of the shoes with the brake flange. Owing to the resilient nature of the block 37, some of this torque is transferred from the leading shoe to the trailing shoe and this is accomplished with the minimum amount of resistance, since the internal friction of the block is the only resistance offered to the transfer of torque.

Figure 3:
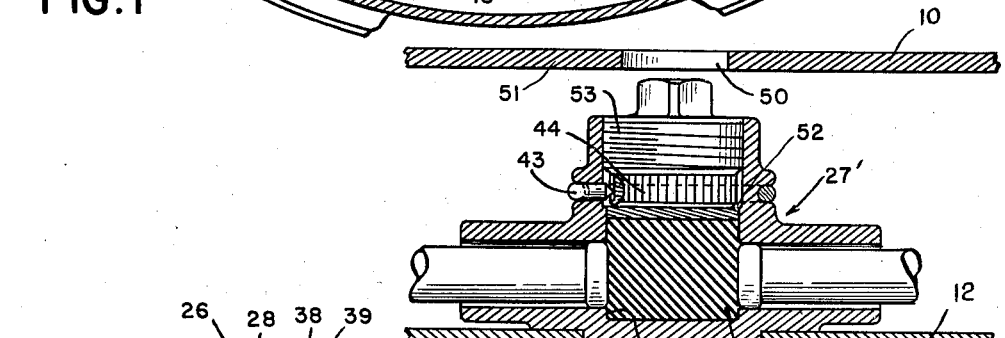
Figure 3 is a fragmentary sectional view through a slightly modified form of construction.

The embodiment of the invention illustrated in Figure 3 differs from the one previously described in that adjustment is effected through an opening 50 in the web 51 of the brake drum. In Figure 3, the adjustment bracket 27' is supported entirely within the brake drum and the threaded opening 52, for receiving the adjusting screw 53, is sufficiently large in this embodiment to permit assembling the resilient block 37' into the chamber 29' through this opening. The block 37' is also formed of a relatively non-compressible resilient material and functions to obtain adjustment of the brake shoes in the same manner as defined in connection with the first described form of this invention.

What I claim as my invention is:

1. In brake mechanism, a brake drum, brake friction means supported within said drum for engagement therewith and having spaced ends, an adjustment device having a member of relatively non-compressible resilient material confined between the ends of the friction means, and means for applying a pressure on said material between the ends of the friction means to displace the sides of the material adjacent said ends outwardly toward the brake drum.

2. In brake mechanism, a brake drum, brake shoes supported within said drum for engagement therewith and having the adjacent ends spaced from each other circumferentially of the drum, and adjustment device having a resilient block confined between the ends of the shoes at one side of the drum, means for applying a pressure on the block between the sides of the latter adjacent the last named ends of the shoes for adjusting the latter relative to the drum, and means between the opposite ends of the shoes for moving said shoes outwardly into engagement with the brake drum.

3. In brake mechanism, a brake drum, brake friction means supported within said drum for engagement therewith and having spaced ends, an adjustment device for varying the clearance between the friction means and brake drum, said adjustment device including a pair of links having the outer ends respectively engaging the ends aforesaid of the friction means, a member of relatively non-compressible resilient material confined between the adjacent ends of the links and engageable with said ends, and means for applying a pressure on said resilient material between the adjacent ends of the links to displace said material in directions to move the links and said ends of the friction means outwardly.

4. In brake mechanism, a brake drum, brake friction means supported within said drum for engagement therewith and having spaced ends, an adjustment device having a member of relatively non-compressible resilient material confined between the ends of the friction means and responsive to the application of pressure on the material between said ends of the friction means to move the latter outwardly toward the brake drum, and an adjusting screw for applying said pressure on the resilient material.

5. In brake mechanism, a brake drum, brake friction means supported within said drum for engagement therewith and having spaced ends, an adjustment device having a member of relatively non-compressible resilient material confined between the ends of the friction means and responsive to the application of pressure on the material between said ends of the friction means to move the latter outwardly toward the brake drum, an adjusting screw for applying said pressure on the resilient material, and means for indicating predetermined increments of adjustment of said screw.

6. In brake mechanism, a brake drum, a pair of brake shoes supported within said drum for engagement therewith and having the adjacent ends spaced from each other circumferentially of the drum, an adjustment device having a block of relatively non-compressible resilient material confined between the ends of the brake shoes at one side of the drum and effective upon the application of pressure to the resilient material between the latter ends to move the same outwardly toward the brake drum, an adjusting screw for applying said pressure to the resilient block, means preventing accidental rotation of the screw and for indicating predetermined increments of adjustment, and an actuator associated with the ends of the shoes at the opposite side of the drum for moving said shoes outwardly into engagement with the drum.

7. In brake mechanism, a brake drum, brake friction means supported within said drum for engagement therewith and having spaced ends, means for adjusting the brake friction means relative to the brake drum including a bracket having aligned tubular portions extending between the ends of the friction means and separated by means of a chamber, a link slidably mounted in each of the tubular portions and having the outer ends respectively connected to said spaced ends of the friction means, a resilient block located in the chamber with the opposite sides engaging the adjacent ends of the links, and means for applying a pressure on the block between the sides thereof engaged by the links to displace said sides in a direction to effect movement of said ends of the shoes toward the brake drum.

8. In brake mechanism, a brake drum, brake friction means supported within said drum for shifting movement circumferentially of the drum and having spaced ends, an adjustment device having a member of relatively non-compressible resilient material confined between the ends of the friction means and effective to transfer torque from one of said ends to the other upon shifting movement of the friction means, and means for applying a pressure on said material between the ends of the friction means to displace the sides of the material adjacent said ends in a direction to effect movement of the friction means outwardly toward the brake drum.

CARL F. BAISCH.